F. O. HUTTON.
CANNING MACHINERY.
APPLICATION FILED JUNE 30, 1920.

1,393,288. Patented Oct. 11, 1921.
2 SHEETS—SHEET 1.

INVENTOR
Frank O. Hutton
BY
Miller & Henry
ATTORNEYS

F. O. HUTTON.
CANNING MACHINERY.
APPLICATION FILED JUNE 30, 1920.

1,393,288.

Patented Oct. 11, 1921.
2 SHEETS—SHEET 2.

INVENTOR
Frank O. Hutton
BY
Miller & Henry
ATTORNEYS

UNITED STATES PATENT OFFICE.

FRANK O. HUTTON, OF SACRAMENTO, CALIFORNIA.

CANNING MACHINERY.

1,393,288.  Specification of Letters Patent.  Patented Oct. 11, 1921.

Application filed June 30, 1920. Serial No. 393,007.

*To all whom it may concern:*

Be it known that I, FRANK O. HUTTON, a citizen of the United States, and a resident of Sacramento, county of Sacramento, State of California, have made a new and useful invention—to wit, Improvements in Canning Machinery—of which the following is a specification.

The invention has for its object the exhausting of cans prior to their sealing, followed by a subsequent sealing, and then cooking of the can (with their contents therein sealed), whereby a more economical use of heat and floor space is accomplished than heretofore.

Other objects will appear from the description and drawings which follow.

In my apparatus I employ a single machine within which the heat is distributed to exhaust the can and thereafter to cook the can contents, and the said machine is arranged in combination with a can sealing means interposed between the exhaust and cooking operations.

By referring to the accompanying drawings my invention will be made clear.

Throughout the figures similar numerals refer to identical parts.

Figures 1, 2:
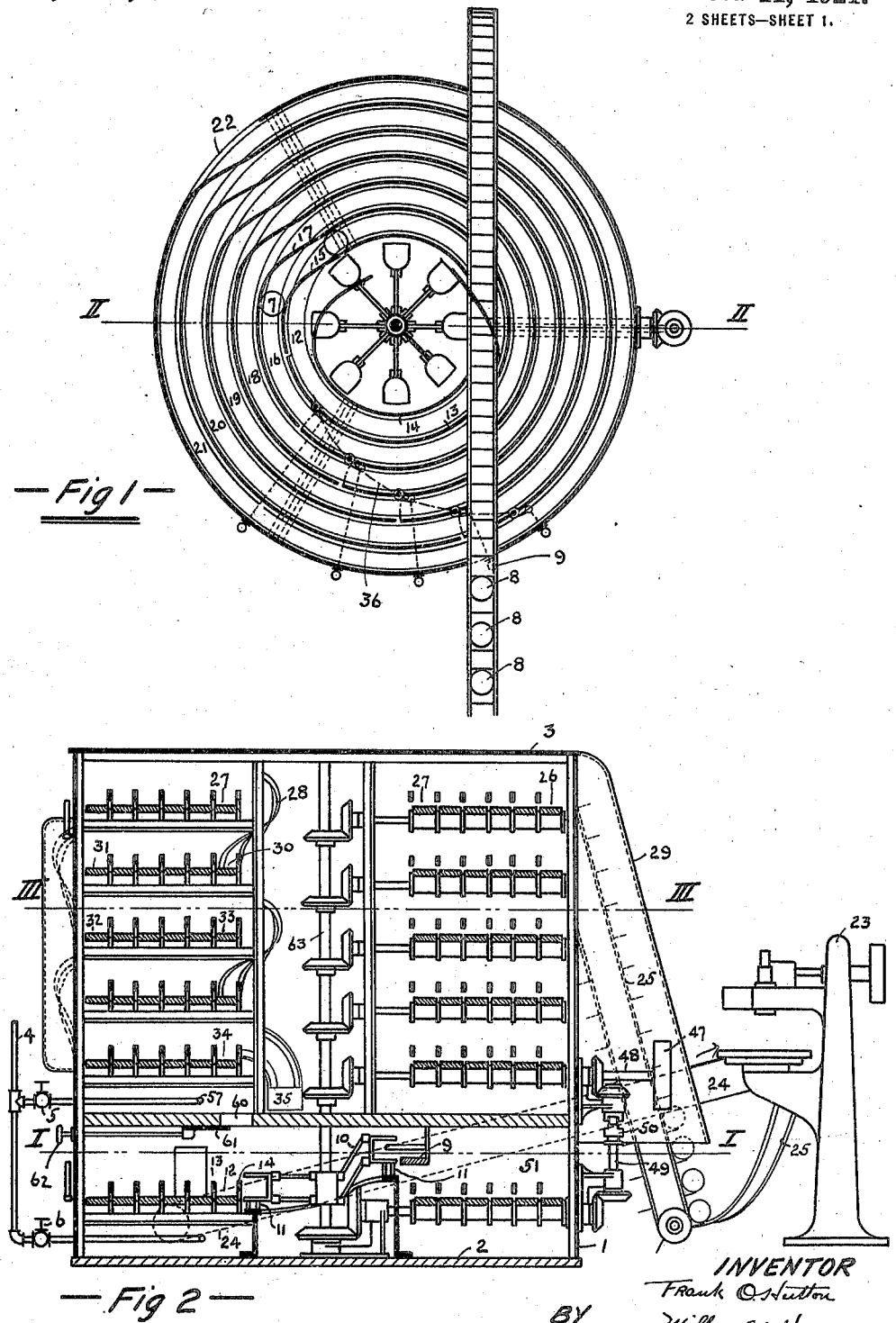
Figure 1 is a section plan through the machine of my invention and on the line I—I of Fig. 2.
Fig. 2 is a vertical section through the center of Fig. 1 and on the line II—II and showing the exhaust compartment and the cooking compartment, and the sealing mechanism.

A heating chamber having a circular wall 1 is mounted upon the floor and provided with a suitable bottom 2 and cover 3. A steam inlet pipe suitably disposed for steam distribution is indicated at 4 under the control of the valves 5, 6, whereby the chamber is raised to any required temperature for cooking and for exhausting respectively.

Cans filled with the contents, which are to be sealed therein and cooked, are indicated as approaching the machine at 8—8—8 carried on a suitable conveyer well known and forming no part of my invention but shown at 9. As the cans are delivered within the chamber from the conveyer 9, they are received by the transfer mechanism 10 which is rotated in synchronism with the conveyer 9.

The arms of the transfer mechanism receive the cans from the conveyer and transfer them to the lower level of the ring surface without disturbing the contents, through the instrumentality of the cam shaped surface 11 on which the transfer arms may roll while maintaining parallelism. The cans are therefrom first received by the ring 12, which ring rotates between the guides 13—14 throughout the greater part of its revolution and until the fixed diverting plate 15 is reached when the can is automatically shunted from its position to that shown at 7 on the ring 16. It is now carried around on the surface of the ring 16 until it arrives at the fixed diverting plate 17 and is automatically transferred to the ring 18. In a similar manner it is later transferred successively to the rings 19—20 and 21, and from the latter ring it finally emerges through the opening 22, from which the cans are conveyed to the sealing machine 23 as by the conveyer 24 where the can is finally sealed and returned as by the conveyer 25, preferably to the top set of traveling rings and is received upon the ring 26 from said conveyer. It is now transferred from ring to ring by similar vanes or wings as previously described, and after the arrival at the ring 27 is transferred to the next lower tier of rings as through the turnover chute 28. The can will now occupy a position on the ring 30 and is thereafter transferred from ring to ring in outward direction until it arrives at the ring 31, from which it is again transferred to the ring 32, and thence again across the cooking compartment to the ring 33, and then transferred to a further tier of rings, and by similar steps finally arrives at the final ring 34 and the opening and a chute 35, by which time the cooking has been entirely completed, and after which the cam may be cooled by well known methods if desired, or transferred to storage depending entirely upon individual requirements.

Figure 3:
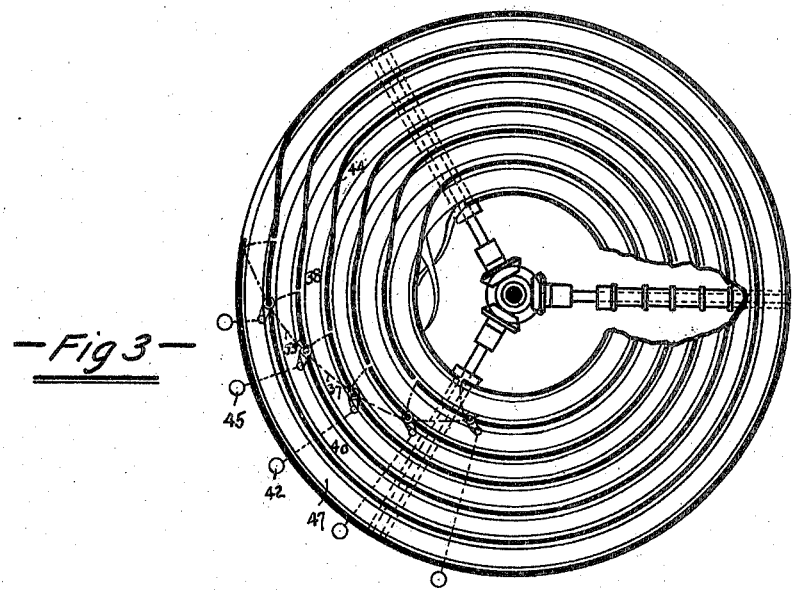
Fig. 3 is a plan of a part of the cooking compartment and showing the transfer chute and movable diverting guides to vary the cooking, taken on the section line III—III of Fig. 2.
Figure 4:
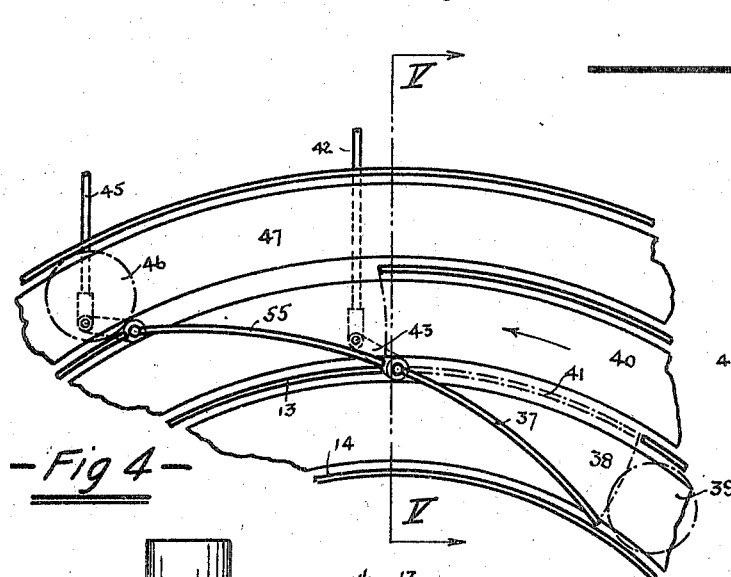
Fig. 4 is a detail plan of part of the transfer mechanism.
Figure 5:
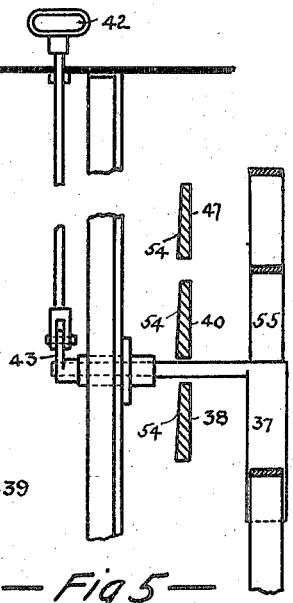
Fig. 5 is a section in elevation of the transfer mechanism.

In the treatment of different products different periods of exhaust and cooking are required. For example, it is customary to exhaust cans containing tomatoes for a period of 4 to 6 minutes, and to cook the sealed can for a period of from 18 to 25 minutes, whereas in the case of peaches, while a similar exhaust period may be employed, a period in excess of 30 minutes is required to cook the fruit properly. In the case of vegetables a longer period is employed. It will thus be seen that in practice it is desirable to change the period of exhausting and cooking from time to time and for this purpose I provide movable transfer plates which are shown in detail in Figs. 4 and 5. These are preferably arranged so that when all are in operation across the tiers of rings, they will form a spiral as indicated at 36 in Fig. 1, and which spiral consists of a series of independent movable wings as 37—55 of Fig. 4, wherein it will be seen that if a can 39 is approaching the wing 37 and being carried on the ring 38, it will be shunted by the wing 37 to the ring 40, whereas if the wing 37 be moved to the dotted position 41 as by the hand lever 42 and bell crank 43, the said can 39 would continue on the ring 38 until it finally arrived at the fixed guide as at 44 Fig. 3. If the wing 37 operated by the handle 42 from the outside of the machine and the wing 55 operated by the handle 45 be set in the full line position of Fig. 4, the can 39 will be transferred from its dotted position on ring 38 directly to its dotted position 46 on the ring 47. The ring 40 therefore has been skipped and the period of can travel on the series of rings 38 to 47 will have been reduced approximately one third for each ring skipped. I prefer to arrange a movable wing as 37 over each of the rings of the cooker and which is readily operable by independent action from the exterior of the cooker, such that the rotation of a can on any one ring may be cut out, and in this way the can is caused to travel faster from its initial position to any required stage in the cooker. It is, of course, to be understood that the diverting wings as 37—55, when employed to reduce the period of cooking are to be operated only at such time as is commensurate with the rate of can feed from the sealing machine.

Figure 6:
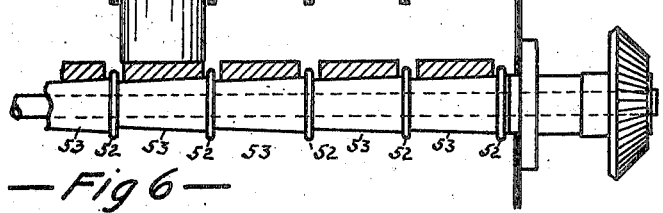
Fig. 6 shows in detail the manner of driving the rings on which the cans travel.

The driving mechanism of the rings, and by which the cans are caused to travel from the entrance of the exhauster and to the conveyer 24, and from the conveyer 25 to the final machine outlet at 35, is indicated in Figs. 1, 2, and 6, wherein the main drive is from the pulley 47 and shafting 48, through suitable gears to the shaft 49, and preferably through the clutch 50 to the exhaust compartment 51, and I prefer to carry the rings upon three or more radially disposed shafts (see Fig. 3), one or more of which may be driven through suitable gear connections from the source of power at 47.

In the disclosure of my invention and the accompanying drawing, the rings ride upon and are driven by three radially disposed supporting and driving shafts preferably carrying spacing collars for said rings as at Fig. 6, and the driving surfaces as 53—52 are preferably made conical so as to secure the best traction of the ring surface, which are thereupon driven without slippage by the conical surface as 53—54.

Between the rings throughout the machine I prefer to form spacing tracks as 13—14, and to chamfer the receiving edge of the rings, so that the cans may be readily received upon a ring from another without interference of the ring edge.

While I have shown the driving mechanism for the cooking compartment as being continued through the center of the machine as at 63, it will be understood that the driving may be accomplished by mechanism entirely on the outside of the machine, and that other variations in construction may be adapted to suit individual requirements without departing from my invention. I have shown the main steam supply pipe at 4 from which the steam utilized for the cooking compartment is distributed through the valve 5 and thence through a suitable steam coil or jets diagrammatically indicated at 57, and I have also shown an auxiliary steam supply to the exhaust compartment as through valve 6 so that the proper temperatures of the cooking and exhaust compartments may be maintained at all times.

To most efficiently utilize the heat employed in my apparatus, I provide one or more communicating passages as 60 between the exhaust and cooking compartments, preferably under the control of the plate valve 61, and externally operable handle 62; or a thermostat operated valve, or other forms may be substituted therefor.

It will be noted that I have shown the conveyer 25 as receiving the cans from the sealing machine at a point near the floor level 2, and the elevator portion of this conveyer should preferably be inclosed as at 29 so that the steam escaping through the opening in the cooker from the said elevator will be prevented and be forced through the port 60 in the exhaust compartment.

The exhaust compartment may be suitably vented at any point if desired to insure a steam transfer from the cooking compartment into the exhaust. It will thus be seen that the greatest economy of steam is secured by my combination exhaust and cooking machine, and therefore the cost of canning greatly reduced and less floor space required and more satisfactory results attained, from the period of the can filling until the final cooking operation has been completed.

While I have shown the cooking compartment above the exhaust compartment, it will be understood that the exhaust compartment may if desired be arranged above the cooking compartment, and other variations in structure and arrangement of parts will suggest themselves to those familiar with the art, which variations employing the combination of cooking, sealing and exhausting will fall within the limits of my invention, and I desire to be understood as claiming all such variations.

I claim:

1. A combined exhausting and cooking machine comprising a pair of annular compartments one superimposed above the other and both within a steam chamber, can conveying means in each compartment, an inlet and outlet for each compartment and means external to said chamber adapted to receive the can from the outlet of one compartment and to transfer said can to the inlet of the other compartment.

2. A combined exhausting and cooking machine as set forth in claim 1 wherein said transfer means embraces also means for sealing the cans in transit.

3. A combined exhausting and cooking machine as set forth in claim 1 and a vertical shaft passing through the said two compartments and operating the can conveying means in each.

4. A combined exhausting and cooking machine as set forth in claim 1 and a vertical shaft passing through the said two compartments and operating the can conveying means in each, wherein said transfer means embraces also means for sealing the cans in transit.

5. A combined exhausting and cooking machine as set forth in claim 1 and a vertical shaft passing through the said two compartments and operating the can conveying means in each, and said can conveying means comprises a plurality of concentric and of superimposed rings on which the cans are adapted to rest and be rotated and means for transferring the cans from one ring to the next ring.

6. A combined exhausting and cooking machine as set forth in claim 1 and a vertical shaft passing through the said two compartments and operating the can conveying means in each, wherein said transfer means embraces also means for sealing the cans in transit, and said can conveying means comprises a plurality of concentric and of superimposed rings on which the cans are adapted to rest and be rotated and means for transferring the cans from one ring to the next ring, substantially as and for the purpose set forth.

7. A combined exhausting and cooking machine comprising a pair of annular compartments superimposed one on the other and a valved passage from one compartment to the other, an inclosing housing and means for supplying steam to the interior of said housing, a plurality of tiers of concentric rings adapted to convey cans, and driving means constructed and adapted to rotate said rings, an inlet and an outlet to each compartment for cans and a transfer chute between adjacent tiers by which cans are transferred from the last ring of one tier to the first ring of an adjacent tier.

8. Apparatus as set forth in claim 7 wherein said transfer means comprises a chute through which the cans are turned bottom side up while traveling therethrough.

9. Apparatus as set forth in claim 7 wherein externally operable shunt means constructed and adapted enabling an operator to shunt cans from one ring by a shorter path across intervening rings for the purpose of shortening the period of can transmit, are provided substantially as shown and described.

In testimony whereof, I have hereunto set my hand at Sacramento, California.

FRANK O. HUTTON.

In presence of—
    Thomas A. Stillwell.